United States Patent

Fujita

[15] 3,704,341

[45] Nov. 28, 1972

[54] COLOR VIDEO SIGNAL RECORDING AND REPRODUCING SYSTEM

[72] Inventor: Mitsuo Fujita, Tokyo, Japan

[73] Assignee: Victor Company of Japan, Limited, Yokohama, Japan

[22] Filed: Feb. 18, 1970

[21] Appl. No.: 12,249

[30] Foreign Application Priority Data

Feb. 21, 1969 Japan ......................44/12553

[52] U.S. Cl...........178/5.2 R, 178/5.4 CD, 178/6.6 A

[51] Int. Cl.............................H04n 9/02, H04n 1/28

[58] Field of Search.........178/5.2 R, 5.2 A, 5.4 C, 5.4 CD, 178/6.6 A, 331/11

[56] References Cited

UNITED STATES PATENTS

| | | | |
|---|---|---|---|
| 2,921,976 | 1/1960 | Johnson | 178/6.6 |
| 3,241,084 | 3/1966 | Klingberg | 331/11 |
| 3,528,026 | 9/1970 | Groendycke | 331/11 |
| R26,412 | 6/1968 | Dolby et al. | 178/5.4 |
| 3,312,780 | 4/1967 | Hurst et al. | 178/5.4 |
| 3,507,983 | 4/1970 | Leman | 178/5.4 |
| 3,359,364 | 12/1967 | Kihara | 178/5.4 |
| 3,084,224 | 4/1963 | Sanford | 178/6.6 |

*Primary Examiner*—Richard Murray
*Assistant Examiner*—Peter M. Pecori
*Attorney*—Louis Bernat

[57] ABSTRACT

A color video signal recording and reproducing system frequency converts a carrier chroma signal of a color television video signal to lower its frequency band to a recordable level. This signal is then mixed with a luminance signal of a limited frequency band to produce a combined signal which is supplied to a monochrome video tape recorder for recording on a magnetic tape. The frequency and phase of a color burst signal of a carrier chroma signal has a variation in the timing axis. An automatic phase control circuit takes this burst signal out of a video signal reproduced from the magnetic tape. The phase control circuit comprises a feedback loop including a voltage control oscillator, color burst keyer, phase comparator, and at least one frequency convertor. The feedback loop signal is made to agree with the output of a reference subcarrier generator. The carrier chroma signal is frequency converted and combined with a luminance signal taken out from the reproduced signal to provide a color video signal. This color signal includes a carrier chroma signal, from which the variation in the timing axis has been removed, and a luminance signal having a limited frequency band.

2 Claims, 4 Drawing Figures

INVENTOR
MITSUO FUJITA

BY Louis Bernat
ATTORNEY

INVENTOR
MITSUO FUJITA
BY Louis Bernat
ATTORNEY

COLOR VIDEO SIGNAL RECORDING AND REPRODUCING SYSTEM

This invention relates to color video signal magnetic recording and reproducing systems. More particularly, the invention is concerned with such a system which enables a correction of a large variation in the timing axis of a color video signal.

Generally, simple type video tape recorder have a relatively narrow frequency band which ranges from about 2.5 $MH_z$ to 3 $MH_z$. This frequency range makes it impossible to directly record and reproduce a color video signal of the standard NTSC system. Various video tape recorder systems have been proposed for recording and reproducing color video signals. For example, prior systems of the type described include, (1) a system utilizing a line sequence color difference signal; (2) a system with an additional chroma signal track for simultaneously recording and reproducing the chroma signal and luminance signal; and (3) a system in which a carrier chroma signal is frequency converted to lower its frequency band to a recordable level. In this third system, the converted signal is combined with a luminance signal of a limited frequency band. Thus, the color video signal is recorded as a modified NTSC color video signal. A reproduced signal has its phase variation corrected by a pilot signal at the same time the signal is hetrodyned with a carrier to provide an NTSC color signal.

The system of (1) above has a disadvantage of high in cost. It requires additional parts such as an electronic circuit for system conversion. Also, it requires special elements such as a delay element, and the like. Moreover, if this system is connected to a television receiving set there are problems which are difficult to overcome. The system (2) above has a disadvantage in that the consumption of tape is increased by twofold. In the system (3) above, it is necessary to maintain the signal to noise ratio of a pilot signal at a high level. A variation in the timing axis of the video signal is eliminated by using the pilot signal. To attain this end, the frequency band of the pilot signal extraction circuit must be made very narrow. Accordingly, if the rate of movement of the tape in a video tape recorder undergoes a great variation, it becomes difficult to extract the pilot signal, a the same time, the pilot signal shows a marked phase shift, thereby making it impossible to remove the variation in the timing axis.

The present invention overcomes all of the aforementioned disadvantages of the prior art systems.

Accordingly, a principal object of this invention is to provide a color video signal recording and reproducing system. Here, an object is to provide a simple type video tape recorder for positively recording and reproducing a color video signal.

Another object of the invention is to provide a color video signal recording and reproducing system with a simple construction which corrects a variation in the timing axis of a reproduced carrier chroma signal. In this connection, an object is to remove large variations in the timing axis of the signal.

Still another object of the invention is to provide a system which enables a removal of a variation in the timing axis without requiring any special signal such as a pilot signal.

A further object of the invention is to provide a system which utilizes the information of a horizontal synchronizing signal and a color burst signal for correcting a variation in the timing axis of a reproduced carrier chroma signal.

Still further objects of the invention is to provide a system which can be applied to any video tape recorder irrespective of its modulation system.

Yet another object of the invention is to provide a video tape recorder system which does not require a capstan servo mechanism and may have a large variation in the timing axis.

Yet a further object of the invention is to provide a color video signal recording and reproducing system which is particularly adapted for use with a simple type video tape recorder having a narrow frequency band extending from about 2.5 $MH_z$ to 3 $MH_z$.

Additional objects as well as features and advantages of the invention will become evident from the description set forth hereinafter when considered in conjunction with the accompanying drawings, in which.

Figures 1, 2:
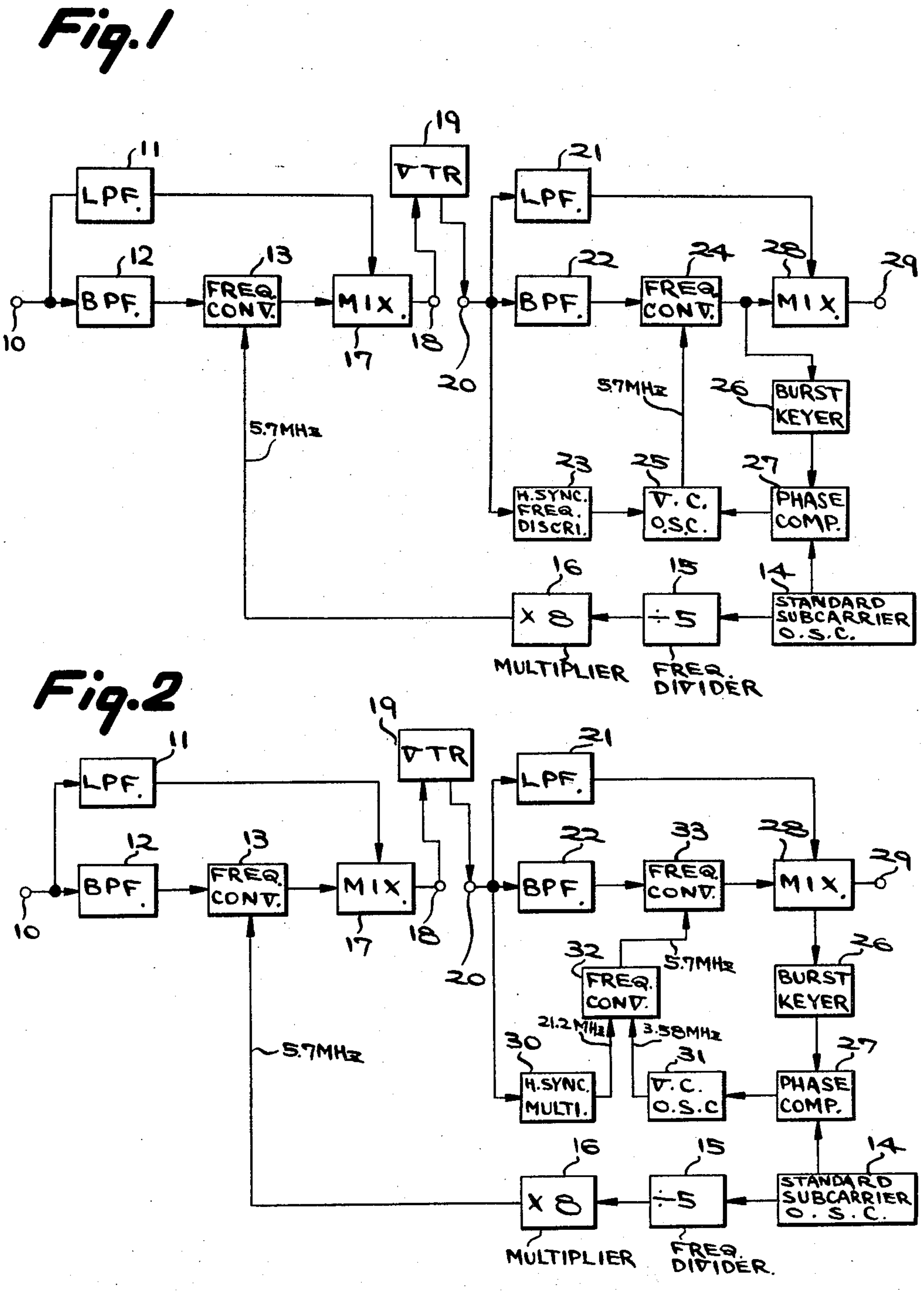
FIG. 1 is a systematic block diagram showing one embodiment of the system according to this invention.
FIG. 2 is a systematic block diagram of another embodiment of the system according to this invention.

A first embodiment of the recording and reproducing system according to this invention will be described with reference to FIG. 1. Here a standard NTSC color video signal, for example, is introduced into the system through an input terminal 10. This signal is supplied to a low-pass filter 11 of 1.6 $MH_z$ and to band-pass filter 12.

A carrier chroma signal is separated by the band-pass filter 12 is applied to a frequency convertor 13. The frequency converter is driven by the output signal of a reference subcarrier generator 14 which has a subcarrier frequency of 3.579545 $MH_z \pm 10_z$. This subcarrier is increased by eight-fifths times by a one-fifth-frequency divider 15 and an 8-times multiplier 16. The resulting output is a signal of approximately 5.7 $MH_z$, which is supplied to the frequency convertor 13. As a result the carrier chroma signal from the band-pass filter 12 converts the subcarrier frequency of the carrier chroma signal to 2.15 $MH_z$.

Figure 3A:
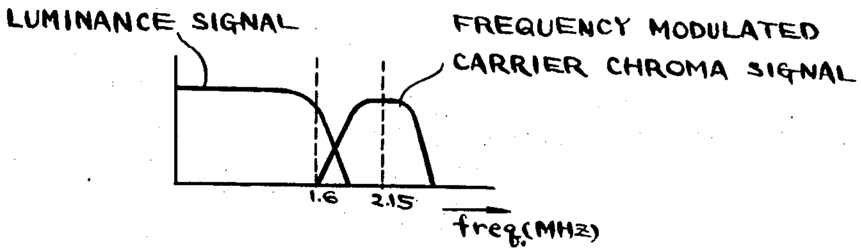
FIGS. 3A and 3B are diagrammatic representations of the spectra of a recording system and reproducing system, respectively.

The carrier chroma signal from the frequency convertor 13 has a subcarrier of the frequency of 2.15 $MH_z$. A mixer 17 combines the subcarrier and the luminance signal, separated by the low-pass filter 11. The mixer output is taken out through an output terminal 18, as a modified NTSC color video signal with a spectrum is shown in FIG. 3A. This modified signal is supplied to the video signal input terminal of a conventional monochrome video tape recorder 19 where it is recorded on a magnetic tape.

A signal reproduced from the tape by the video tape recorder 19 is supplied, through a an input terminal 20 of the present system. This signal is applied to a low-pass filter 21, a bandpass filter 22, and a horizontal synchronizing signal frequency discriminator 23. The carrier chroma signal having a subcarrier of the frequency of 2.15 $MH_z$ is separated from the reproduced signal by the band-pass filter 22. Its frequency is converted at a frequency convertor 24 responsive to the output signal of a voltage control oscillator 25, having a center frequency of 5.7 MHz. Thus, the reproduced signal restored to the original carrier chroma signal, having a subcarrier of the frequency of 3.58 MHz.

The output signal of the frequency convertor 24 is supplied to a color burst keying circuit 26. Responsive thereto, a color burst signal is keyed at 26, and its phase is compared at a phase comparator 27 with the phase of the output signal of the reference subcarrier generator 14. The output voltage signal of the phase comparator 27 represents a detected phase error, which controls the frequency of the output of the voltage control oscillator 25.

Accordingly, a feedback loop is formed by the frequency convertor 24, color burst keying circuit 26, phase comparator 27, voltage control oscillator 25, and frequency convertor 24 which are connected to one another in the indicated order. These elements constitute an automatic phase control circuit which brings the phase of the color burst signal of the carrier chroma signal appearing as the output of the frequency convertor 24 into agreement with the phase of the output signal of the reference subcarrier generator 14.

The color burst signal at the output of the frequency convertor 24 is converted responsive to the center frequency $f_0$ of the voltage control oscillator 25. If this converted frequency does not have a frequency which is near enough to the frequency (3.759545 MHz ± 10 Hz) of the output signal from the reference subcarrier generator 14, the automatic phase control circuit would make an error in its operation. Thus, the difference in frequency must remain within about ±0.2 percent. Generally, a simple type of video tape recorder is not provided with a capstan servo mechanism. Thus, the subcarrier frequency of the reproduced carrier chroma signal often fluctuates by more than ±0.2 percent.

In the system according to this invention, the horizontal synchronizing signal of the reproduced modified NTSC video signal is subjected to a frequency discrimination at the frequency discriminator.

The horizontal synchronizing signal and the carrier chroma signal undergo the same variation in the timing axis. Thus, the frequency discriminator 23 produces an output voltage which is proportional to a variation in the subcarrier frequency of the reproduced carrier chroma signal. The output voltage of the frequency discriminator 23 controls the center frequency of oscillation of the voltage control oscillator 25. It is thus possible to maintain the aforementioned frequency difference within the range of ±0.2 percent even when a variation in the timing axis is caused by a large variation in the rate of movement of the tape. The control of the voltage control oscillator 25 by the frequency discriminator 23 enables the automatic phase control circuit to operate in a stable manner — even if the subcarrier frequency of the reproduced carrier chroma signal has a variation of about ±2 percent.

The arrangement also stabilizes the phase of the reproduced carrier chroma signal even if the rate of movement of the magnetic tape undergoes a great variation as is often the case with a simple type video tape recorder. The system operates in the same manner even if the frequency discriminator 23 for the horizontal synchronizing signal is replaced by a frequency discriminator for the color burst signal.

According to this invention, the frequency and phase of the color burst signal of the carrier chroma signal at the output of the frequency convertor 24 are brought into agreement with those of the output signal of the reference carrier oscillator 14. Actually, however, there may be a slight difference in phase due to a constant phase error. Thus, the invention removes the variation in the timing axis of the reproduced carrier chroma signal. Its subcarrier frequency is made identical with the subcarrier frequency of the standard NTSC system.

Figure 3B:
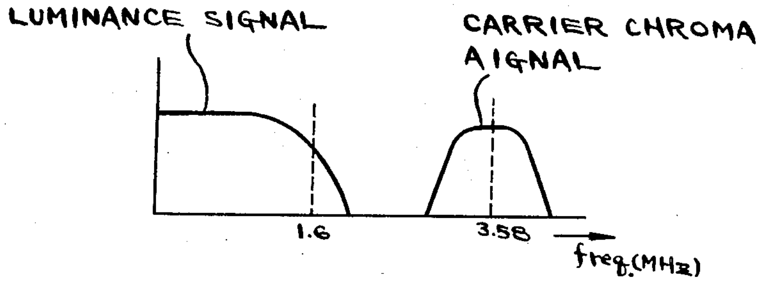

If the carrier chroma signal from the frequency convertor 24 and the luminance signal appearing as an output of the low-pass filter 21 are mixed at a mixer 28, it is possible to take out an NTSC color video signal at an output terminal 29. This NTSC signal comprises a carrier chroma signal having the variations in the timing axis removed, and a luminance signal having a limited frequency band. The spectrum of the signal is shown in FIG. 3B.

A second embodiment of the system, according to this invention, will now be described with reference to FIG. 2. The explanation is omitted for parts which are similar to those of the first embodiment shown in FIG. 1 and are designated by like reference characters.

An NTSC color video signal reproduced from a magnetic tape by means of a video tape recorder is applied to the input terminal 20. This signal is applied to the low-pass filter 21 and band-pass filter 22 as well as a horizontal synchronizing signal multiplier circuit 30. The horizontal synchronizing signal is separated from the video signal in circuit 30. The basic wave component is multiplied to be near the color subcarrier frequency of a modified NTSC color video signal. The multiplied signal has a frequency deviation which is approximately the same as that of the color subcarrier frequency. In this embodiment, the basic wave component of the horizontal synchronizing signal is multiplied by 5 × 3 × 3 × 3. Thus, it has a frequency of about 2.12 MHz which is near enough to 2.15 MHz of the color subcarrier frequency.

The center frequency of oscillation of a voltage control oscillator 31 is selected at about 3.58 MHz. The output of the multiplier circuit 30 is frequency converted by the output of the voltage control oscillator 31 at a frequency convertor 32. Thus, it is possible to produce a signal of the frequency of 5.7 MHz as an output of the frequency convertor 32. This 5.7 MHz signal is used at a frequency convertor 33 to frequency convert the reproduced carrier chroma signal from the band-pass filter 22.

A feedback loop comprises the color burst keying circuit 26, phase comparator 27, voltage control oscillator 31, frequency convertor 32 and frequency convertor 33 connected to one another in the indicated order. This circuit constitutes an automatic phase control circuit for removing a variation in the timing axis of the carrier chroma signal. The circuit 26 is used for keying a color burst signal responsive to the output signal of the mixer 28.

In this second embodiment, the frequency convertor 32 provides an output signal of a frequency obtained by mixing the output signal of the oscillator 31 with the signal of the frequency of 2.12 MHz which has a frequency deviation approximately similar to that of the subcarrier frequency of the reproduced carrier chroma signal. Thus, the center frequency of the voltage control oscillator is not directly controlled in the second embodiment as is done in the first embodiment. However, the arrangement of the second embodiment has substantially the same effect as the arrangement of the first embodiment because the former can be described as controlling the voltage control oscillator indirectly. Thus, the second embodiment also stabilizes the phase of a reproduced carrier chroma signal having a large variation in the timing axis.

While the present invention has been described with reference to preferred embodiments, it is to be understood that the invention is not constructed to be limited thereto, and that many changes and modifications may be made therein without departing from the spirit and scope of the invention.

What is claimed is:

1. A color video signal recording and reproducing system comprising a magnetic tape recorder having a predetermined maximum recordable frequency limit, first low-pass filter means for filtering a luminance signal from a color video signal, said video signal including frequency components which are higher than said maximum recordable frequency limit, said first low-pass filter means having a cut-off frequency lower than said maximum recordable frequency limit, first band-pass filter means for separating a carrier chroma signal from said color video signal, first frequency converter means for converting the frequency band of said carrier chroma signal into a frequency band which lies between the cut-off frequency of said first low-pass filter means and said maximum recordable frequency limit, means for superimposing the output of said first low-pass filter means and the output of said first frequency converter means, means for recording the output of said superimposing means on a magnetic tape in said magnetic tape recorder, means for taking out the superimposed signal reproduced from said magnetic tape by said magnetic tape recorder, second low-pass filter means for separating a luminance signal from the output signal of said taking-out means, second band-pass filter means for filtering the frequency converted carrier chroma signal from the output signal of said taking-out means, second frequency converter means for restoring the frequency band of the filtered carrier chroma signal to the original frequency band, means comprising a color burst keyer for keying a color burst signal from the output signal of said second frequency converter means, oscillator means for producing a reference subcarrier signal, means for comparing the phase of said color burst signal with the phase of the output signal of said oscillator means and for producing an error signal corresponding to the phase difference between both signals, voltage control oscillator means having a center frequency of oscillation which is controlled responsive to said error signal, multiplier means for separating a horizontal synchronizing signal from the output signal of said taking-out means and multiplying the frequency of said horizontal synchronizing signal to become a frequency near the subcarrier frequency of the converted carrier chroma signal, and third frequency converter means for frequency converting the output signal of said amplifier means responsive to the output of said voltage control oscillator means and for providing an output signal which is supplied to said second frequency converter means, thereby constituting a feedback loop together with said color burst keyer and said phase comparator means.

2. A color video signal recording and reproducing system as defined in claim 1 wherein said color video signal is an NTSC color video signal.

* * * * *